United States Patent
Riggan et al.

(10) Patent No.: US 6,490,252 B1
(45) Date of Patent: Dec. 3, 2002

(54) SYSTEM AND METHOD FOR PREVENTION OF CELL LOSS DUE TO QUALITY OF SERVICE CONTRACTS IN AN ATM NETWORK

(75) Inventors: Richard J. Riggan, San Jose, CA (US); William Joseph Beyda, Cupertino, CA (US); Shmuel Shaffer, Palo Alto, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/152,818

(22) Filed: Sep. 14, 1998

Related U.S. Application Data

(62) Division of application No. 08/800,095, filed on Feb. 12, 1997, now Pat. No. 5,898,673.

(51) Int. Cl.[7] .............................................. H04L 12/26
(52) U.S. Cl. ........................ 370/237; 709/239; 370/352; 370/401
(58) Field of Search ................................ 370/400, 401, 370/402, 466, 467, 238, 237, 236, 235, 338, 351, 352, 410, 463, 228, 355, 252, 218, 354, 217; 340/827; 455/455; 709/239

(56) References Cited

U.S. PATENT DOCUMENTS

| | | | | |
|---|---|---|---|---|
| 5,253,248 A | * | 10/1993 | Dravida | 370/237 |
| 5,692,126 A | * | 11/1997 | Templeton et al. | 370/352 |
| 5,719,854 A | * | 2/1998 | Choudhury et al. | 370/231 |
| 5,732,078 A | * | 3/1998 | Arango | 370/355 |
| 5,912,877 A | * | 6/1999 | Shirai et al. | 370/228 |
| 6,064,653 A | * | 5/2000 | Farris | 370/237 |

FOREIGN PATENT DOCUMENTS

| | | | |
|---|---|---|---|
| GB | 2 316 266 | * | 2/1998 |

* cited by examiner

*Primary Examiner*—Steven Nguyen
*Assistant Examiner*—Phuongchau Ba Nguyen

(57) ABSTRACT

A data traffic network 200 in which excess cells, or cells whose transfer is expected to cause the user to exceed the QoS traffic contract bandwidth limit, are transferred to a destination node 300b via an alternate or secondary network 212. More particularly, traffic received at a first ATM node 300a (for example, an end user node) is or has been classified according to traffic type, such as voice, data, or video (with their corresponding characteristics). Prior to packetizing the data streams into the ATM fixed length packets, the ATM node 300a, 600a determines whether the QoS traffic contract bandwidth limit has been exceeded or is likely to be exceeded. If so, then the corresponding traffic is transmitted to the destination node 300b via an appropriate alternate network 212. For example, voice traffic is transferred to a PBX and, ultimately, to the public switched telephone network (PSTN). Once the bandwidth utilization of the ATM network 305 falls below the threshold level, all traffic is routed back through the ATM network.

15 Claims, 7 Drawing Sheets

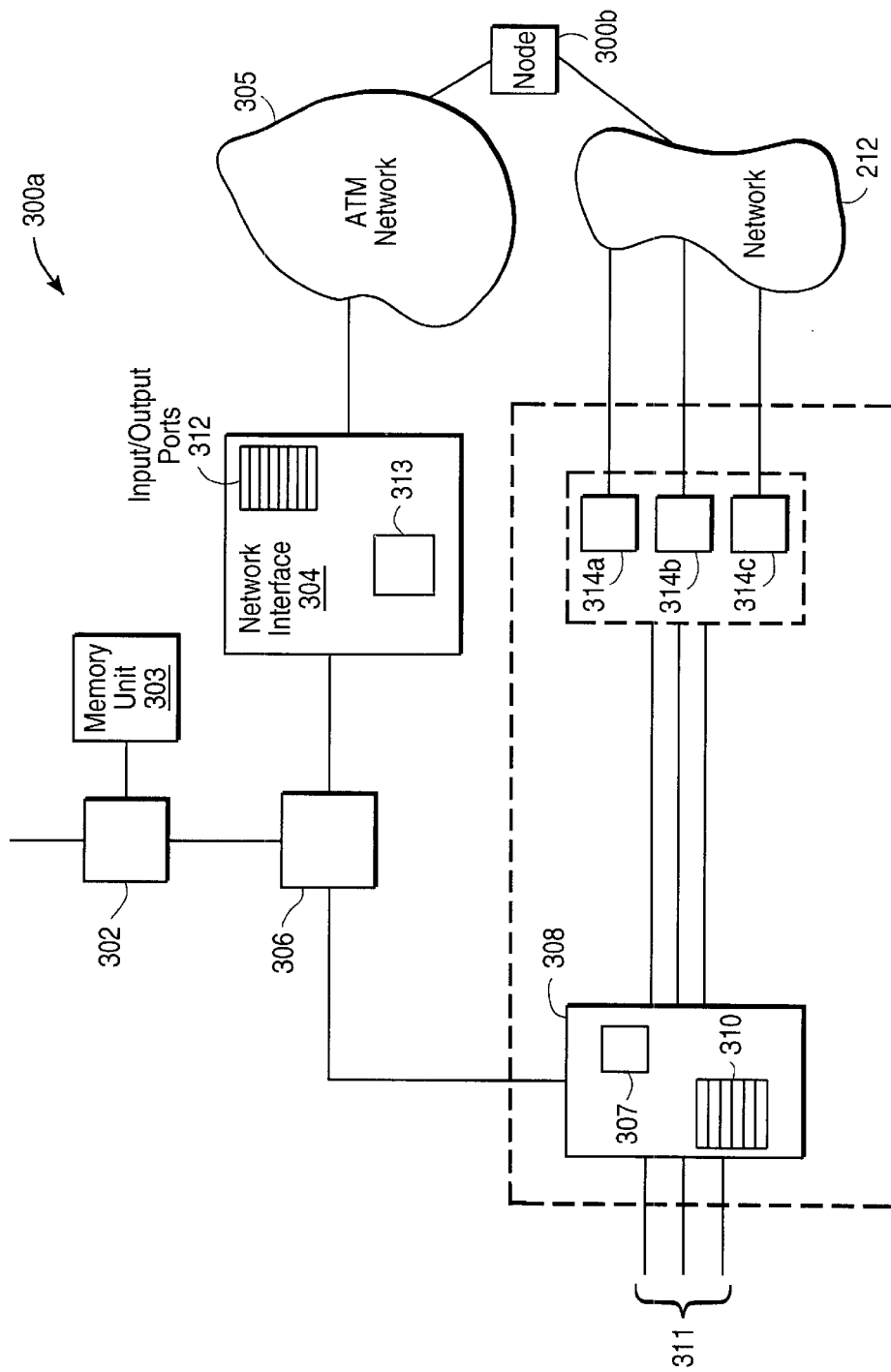

SYSTEM AND METHOD FOR PREVENTION OF CELL LOSS DUE TO QUALITY OF SERVICE CONTRACTS IN AN ATM NETWORK

This is a divisional, of application Ser. No. 08/800,095 filed Feb. 12, 1997, now U.S. Pat. No. 5,898,673.

BACKGROUND OF THE INVENTION

1. Field of the Invention

This invention relates to asynchronous transfer mode networks and, more particularly, to a system and method for avoiding cell loss due to quality of service contract bandwidth usage constraints.

2. Description of the Related Art

The development of broadband integrated services digital networks (BISDN) based on asynchronous transfer mode (ATM) switching technology has the potential for ultimately replacing the plurality of existing networks presently required to carry voice, data, and video traffic. ATM is a high-speed packet switching technique employing short, fixed-length cells that are statistically multiplexed over virtual connections. Using ATM, different traffic types received in various user formats are segmented into fixed length cells that are transported to and reassembled into the original format at the destination node.

To achieve universality, standards and recommendations for service for ATM-based networks are promulgated by the International Telecommunications Union (ITU). In particular, the ITU-I Recommendation I.371 specifies a method for policing traffic through an ATM-based network via the use of traffic management contracts. A traffic contract is an agreement between an ATM user and the network provider regarding the quality of service (QoS) the ATM user can expect under specified conditions. The contracts are designed to ensure the integrity of information transport as well as an acceptable level of delay for voice and video traffic. One parameter specified in the traffic contract is the amount of guaranteed bandwidth. When a user exceeds the agreed-upon bandwidth, the excess cells are liable to be discarded if the network is congested. In order to ensure the integrity of data and information transport, users are therefore typically required to pay for a larger bandwidth allocation, which can be relatively expensive.

Accordingly, it is desirable to provide a system and method for ensuring cell integrity at optimal costs for QoS traffic contracts in ATM networks.

SUMMARY OF THE INVENTION

These problems are solved in large part by a system and method according to the present invention in which excess cells, or cells whose transfer is expected to cause the user to exceed the QoS traffic contract bandwidth limit (or any predetermined QoS or bandwidth threshold), are transferred to a destination node via an alternate or secondary network. More particularly, user traffic received at a first ATM node (for example, an end user node) is or has been classified according to traffic type, e.g., voice, data, or video (with their corresponding characteristics). Prior to packetizing the data streams into the ATM fixed length packets, the ATM node determines whether the QoS traffic contract bandwidth limit has been exceeded or is likely to be exceeded. If so, then the corresponding traffic is transmitted to the destination node via an appropriate alternate network. For example, voice traffic that would cause the QoS threshold to be exceeded is transferred to a PBX and, ultimately, to the public switched telephone network (PSTN). Once the bandwidth utilization of the ATM network falls below the threshold level, all traffic is routed back through the ATM network.

A method according to one embodiment of the present invention comprises defining a quality of service threshold for an ATM network. The quality of service threshold is less than or equal to, preferably somewhat lower, than a bandwidth limit defined in a quality of service traffic contract. The method further comprises receiving user data at a first ATM node and identifying the user data according to any of a plurality of data types. The method further comprises receiving information from a network manager identifying whether a usage of the ATM network has exceeded the QoS threshold. At least a portion of the user data are routed via a corresponding secondary network if the transmission of the user data would cause the QoS threshold to be exceeded, or if it has already been exceeded. The secondary network is chosen to correspond to the type of user data.

A method for rerouting data in an asynchronous transfer mode network according to another embodiment of the present invention comprises defining a quality of service threshold for the ATM network and receiving user data at a first ATM node. Again, the data are identified according to any of a plurality of user data types. Information is received from a network manager identifying whether a usage of the ATM network has exceeded the QoS threshold. Based on past usage patterns, and the received information, the method farther comprises predicting when network usage is expected to exceed the QoS threshold. At least a portion of the user data are routed to a corresponding secondary network during periods when the usage is predicted to exceed the QoS threshold. Information used to predict when the usage exceeds the QoS threshold includes the source of the user data which is being transmitted and the type of user data which is being transmitted. The data transmitted via the ATM network and the secondary network are reintegrated at a secondary destination ATM node.

An ATM node according to one embodiment of the present invention comprises a user network interface for receiving user traffic, such as voice, video or data. The user network interface is coupled to a control CPU, which in turn is coupled to receive one or more control signals from an external network management system, preferably an ATM network manager. The user network interface is coupled to a switch to provide switching of the received traffic to a plurality of network interface modules. One of the network interface modules preferably comprises an ATM network interface module. The remaining network interface modules connect the ATM node with one or more secondary networks, such as an integrated services digital network (ISDN), the public switched telephone network (PSTN), a wireless network, or a frame relay network. When traffic is received at the user network interface, a control signal from the control CPU (responsive to the network management system) indicates whether the QoS threshold has been or is likely to be exceeded. If not, the switch switches the traffic to the ATM network interface module and the traffic is transferred to a destination node via the ATM network. If, however, the QoS threshold has been or is likely to be exceeded, the switch switches at least a portion of the incoming traffic to one or more of the secondary network interface modules. Similarly, data may be received at the ATM node via one of the secondary networks and switched to the user network interface and, ultimately, provided to the user.

BRIEF DESCRIPTION OF THE DRAWINGS

A better understanding of the present invention is obtained when the following detailed description is considered in conjunction with the following drawings in which:

FIGS. 3A and 3B are block diagrams of an ATM node according to an embodiment of the present invention;

DETAILED DESCRIPTION OF THE INVENTION

Figure 1A:
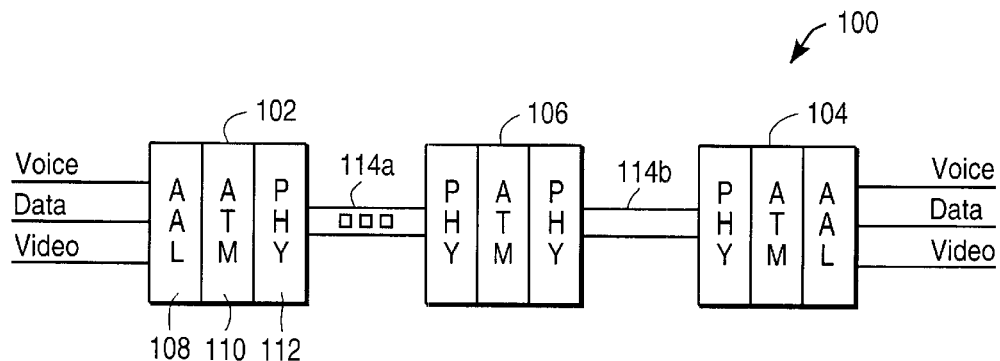
FIGS. 1A and 1B illustrate ATM system architecture according to the prior art.

FIG. 1—ATM System Architecture

Turning now to FIG. 1, a block diagram illustrating basic ATM system architecture is shown. In a preferred embodiment, the present invention is used in an ATM network. However, it is noted that the present invention may be used in any of various types of networks which include quality of service contracts and/or where it is desirable to reroute network traffic to other networks during high use periods.

As illustrated, the ATM system 100 includes a first end station or node 102, a switch or switch node 106 and a second end station or node 104. ATM cells are transferred between the end stations and switches via network interconnects 114a, b. In an ATM network, each cell is 53 bytes in length, of which 5 bytes comprise a header and 48 bytes comprise the user payload. The ATM cell header contains control and routing information such as flow control information, a virtual channel identifier, a virtual path identifier, a payload type identifier, a cell loss priority field and a header error control field. The payload type identifier indicates whether the cell contains upper layer header information or user data.

Each end station 102, 104 may be divided into three protocol layers: an adaptation layer (AAL), an ATM layer and a physical layer. The physical layer defines the electrical characteristics and network interfaces, i.e., the "wire." The "wire" is preferably optical fiber (SONET), but can also comprise a wireless interface, or other wired media such as copper twisted pair or coaxial cable. The physical layer, for example, adapts the ATM fixed-length cells into SONET frames.

The ATM layer multiplexes and demultiplexes cells belonging to different connections identified by the unique virtual channel identifiers and/or virtual path identifiers. More generally, the ATM layer takes the data to be sent and adds the 5 byte header information that assures that the cell is sent on the right connection.

Finally, the adaptation layer assures the appropriate service characteristics and divides all types of data into the 48 byte payload that will make up the ATM cell. Thus, when sending, the AAL receives the classes of information from die higher layers and adapts them to occupy the fixed length ATM cells. When receiving, the AAL receives the data in the 48 byte payloads and reassembles it to fit the user's service requirements.

Figure 1B:
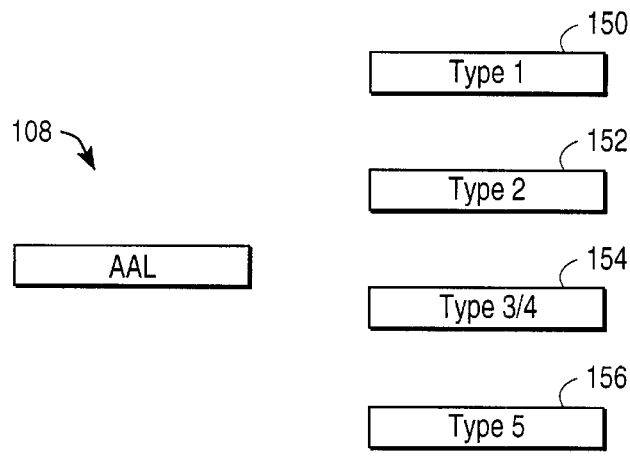

Five types of AAL layers have been defined, as illustrated in FIG. 1B. As a practical matter, Types 3 and 4 have been combined such that only Types 1, 2, 3/4 and 5 are in use. The AAL Type 1 adaptation layer is used for constant bit rate, asynchronous traffic, such as voice and video. The AAL Type 2 adaptation layer is used for variable bit rate connection-oriented services such as video and audio. The AAL Type 3/4 adaptation layer is used for variable bit rate asynchronous connectionless traffic such as SMDS and LANs. Finally, the AAL Type 5 adaptation layer is used for variable bit rate asynchronous traffic such as X.25 or frame relay.

Figure 2:
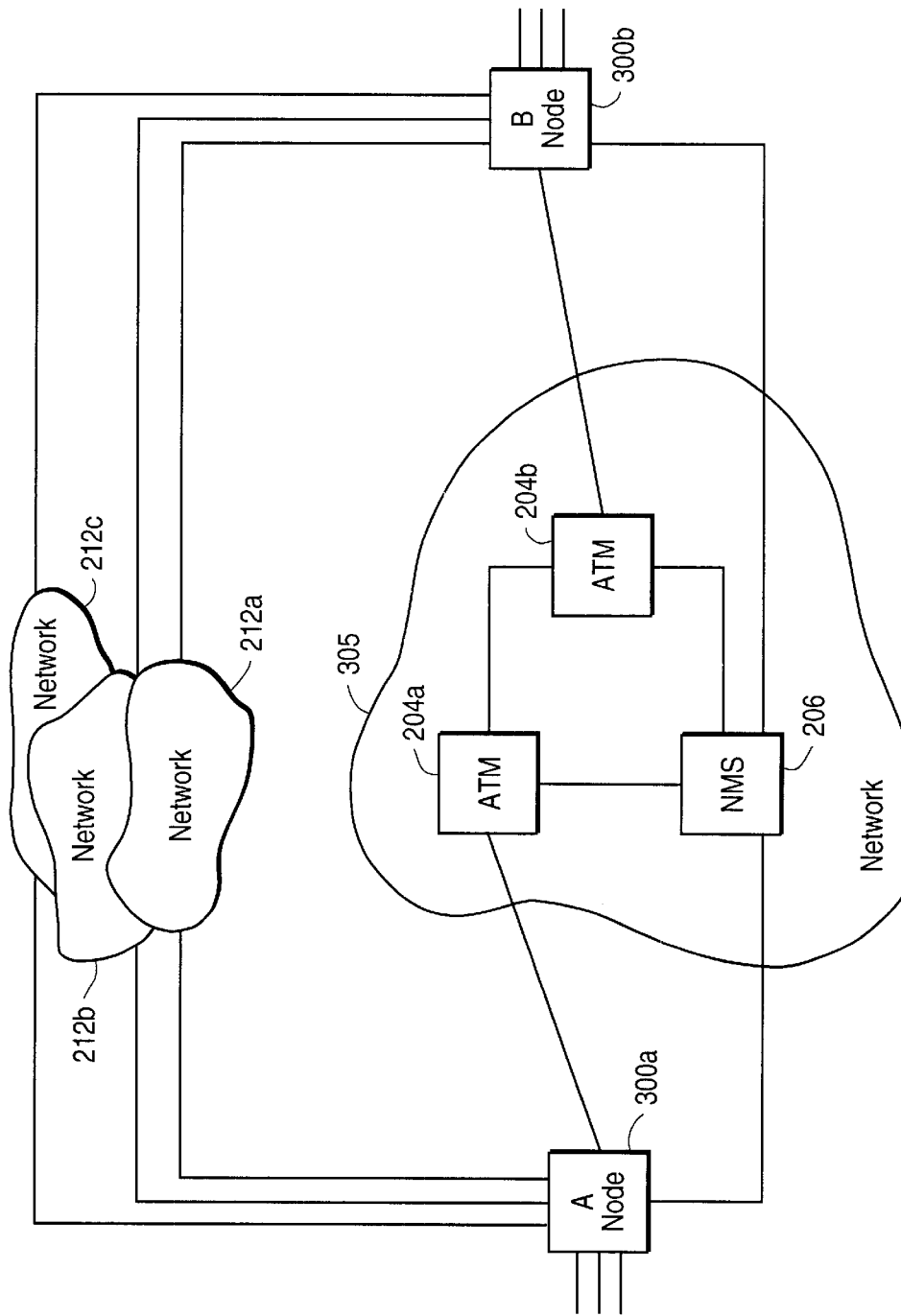
FIG. 2 is a diagram illustrating an ATM network and a secondary network according to the present invention.

FIG. 2—ATM Network and Secondary Network Configuration

Turning now to FIG. 2, a diagram illustrating an ATM network 305 connecting two nodes is illustrated. One or more secondary networks 212a–212c are illustrated in parallel with the ATM network, also connecting the two nodes. The system includes an ATM network 305 including a plurality of ATM switches 204a, 204b and a network management system 206 coupled to the ATM switches 204a, 204b. The ATM switches 204a, 204b perform ATM switching network functions. The network management system 206 provides supervisory control for and monitoring of the network. The ATM network 305 is illustrative only, and it is noted that the present invention may be used with other different and/or more complex types of ATM networks.

The system 200 further includes a first node 300a and a second node 300b, which are coupled via the ATM network 305. Node 300a and node 300b themselves comprise ATM nodes and include network interworking units (IWU)(not shown) for interfacing the ATM networks for reception of user data. Node 300a and node 300b are further coupled to one another via one or more secondary networks 212a–212c. Secondary networks 212a–212c comprise networks operating according to alternative network and/or switching protocols. For example, secondary networks(s) 212a–212c comprise an X.25 network, the public switched telephone network (PSTN), an ISDN network, a cable broadcast television network, a wireless network, or a frame relay network.

Operation of the network system of FIG. 2 is as follows: A quality of service (QoS) traffic contract bandwidth limit and a corresponding QoS threshold are established. As discussed above, a QoS traffic contract is an agreement between an ATM user and the network provider regarding the quality of service (QoS) the ATM user can expect under specified conditions. One parameter specified in the traffic contract is the amount of guaranteed bandwidth. The network management system 206 provides monitoring of whether the user has exceeded the agreed-upon bandwidth limit and/or the QoS threshold. A plurality of user data streams are received into node 300a. The user data streams may comprise data, voice, or video traffic in various synchronous and asynchronous formats. Node 300a identifies the type of traffic received and receives a signal from the network management system indicating whether or not the QoS threshold has been reached. If the traffic level is below the threshold, the node 300a adapts the received traffic into ATM cells, establishes the appropriate virtual paths and connections, and transfers the cells to node 300b via ATM network 305.

If the signal from the network management system 206 indicates that the QoS threshold is exceeded, then at least a first portion of the data, e.g., excess cells, are routed to node 300b via one or more of the secondary networks 212a–212c. The particular secondary network is chosen based upon the type of data which is to be transmitted. More particularly, the voice, data and video streams may be classified according to adaptation layer type. Thus, the incoming traffic is classified as AAL Type 1, AAL Type 2, AAL Type 3/4 or AAL Type 5 traffic. The traffic is then directed to a secondary network which is capable of handling traffic of the corresponding type.

For example, voice or video traffic transmitted via the AAL Type 1 adaptation layer may be routed to a PBX and hence the public switch telephone network (PSTN). Alternatively, the traffic may be routed to an ISDN router and then to an ISDN public network, or to a wireless interface and a wireless network. With regard to AAL Type 2 data streams comprising, for example, video and/or audio information, the information may be routed via an ISDN router and an ISDN public network, or a wireless network. AAL Type 3/4 data streams may be routed to a PBX via a PPP (point to point protocol) link, to an ISDN router via the PPP link, an ISDN public network via a PPP link, or via a LAN router to a secondary data network. Similarly, AAL Type 3/4 data streams may be routed to a frame relay access device, a frame relay network, an X.25 network, any of a variety of wireless data networks, Internet or other miscellaneous analog/digital data networks. Finally, AAL Type 5 data streams may similarly be routed to frame relay access devices, frame relay networks, X.25 networks, the Internet, wireless data networks and other miscellaneous analog/digital data networks. It is noted that these lists are not exclusive and are exemplary only. A variety of other secondary networks suitable for transporting traffic of the particular AAL types is contemplated.

Once the bandwidth utilization of the ATM network falls below the predetermined threshold, the traffic is routed back through the ATM network. Once data has been transmitted via the alternate or secondary network, the data are reintegrated back at the destination node into the common data streams with data that has been transmitted across the ATM network.

In an alternate embodiment, predictive statistical analysis is employed to identify the time periods during which the ATM user most frequently exceeds the bandwidth limit of the network contract. In this embodiment, a controller in node 300a, for example, monitors the source and type of traffic which is most often responsible for such a violation. The controller automatically reroutes specific types of traffic during specific time periods regardless of the actual measured bandwidth level. Alternatively, the controller reroutes traffic based on a combination of statistical prediction and actually exceeding the threshold.

Figure 3A:
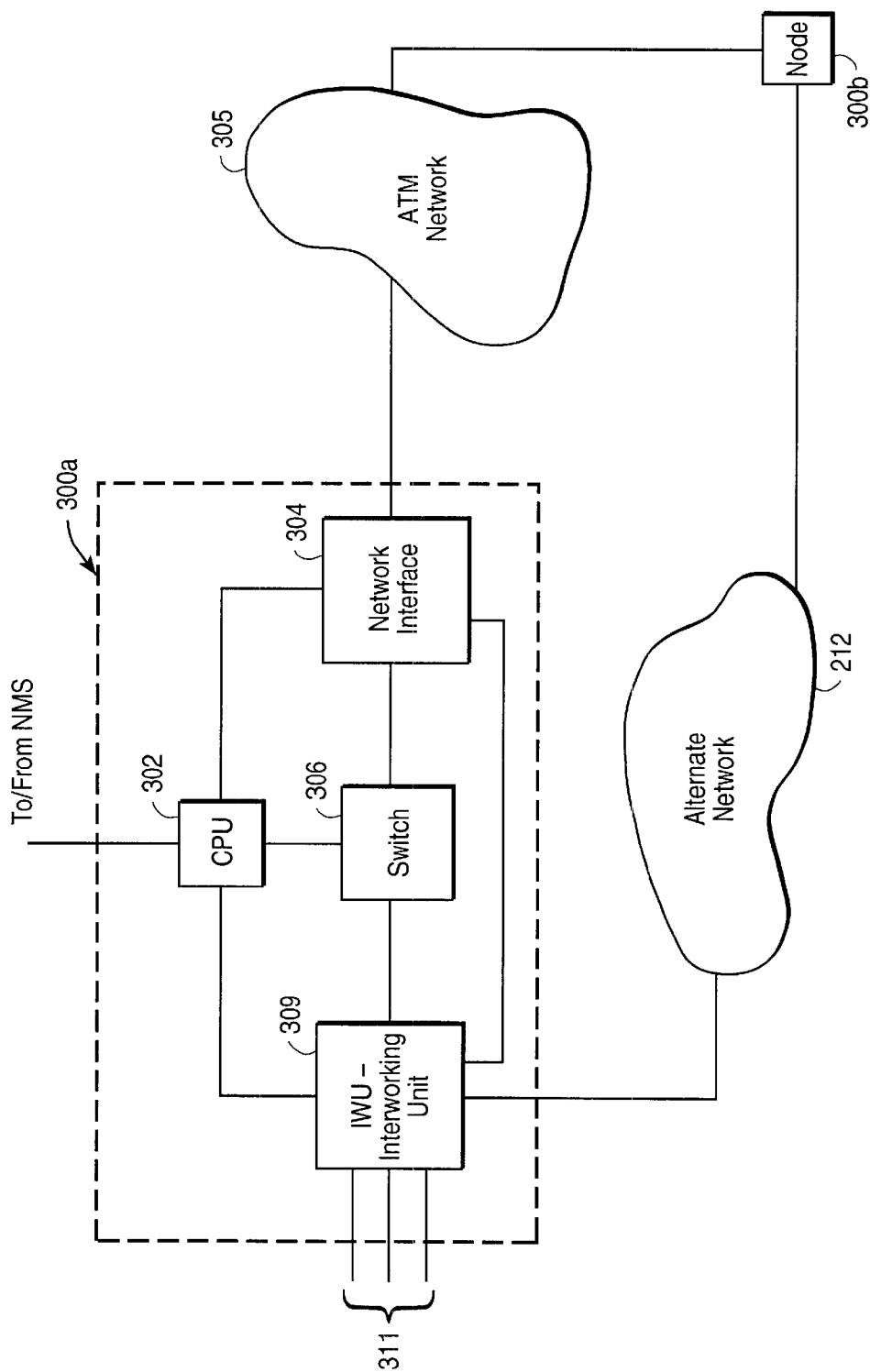

FIG. 3A—Block Diagram of ATM Node

Turning now to FIG. 3A, a block diagram illustrating an ATM node 300 including an ATM interworking unit (IWU) 309 according to one embodiment of the present invention is shown. The IWU 309 couples the ATM network to the user's premises devices, which include, for example telephony devices and local area networks (LANs). The IWU 309 is further coupled to a control CPU 302, a switch unit 306, and an ATM network interface 304 (via switch unit 306). The ATM network interface 304 is coupled to receive and transmit information along the ATM network 305. The IWU 309 is further coupled to one or more alternate networks 212, as will be explained in greater detail below.

IWU 309 is coupled to receive data streams or user traffic at input lines 311. The data streams comprise one or more of voice, video and data information in a variety of formats and transmitted according to any of a variety of protocols. For example, data information may be received via a LAN connection according to an Ethernet or IEEE 802.3 protocol. IWU 309 is coupled to receive the data streams in the user-premises format and process the information into an ATM-compatible format (i.e., into the fixed length ATM cells). IWU 309 is further coupled to receive a control signal or signals from control CPU 302 indicating whether a QoS threshold has been, or is about to be breached. If so, then the data streams or streams which are the cause of the actual or potential breach of the QoS threshold are transferred by the IWU 309 to the end node via one or more of the alternate networks 212. For example, if LAN data is the cause of the potential or actual breach of the QoS threshold, then the LAN packets are processed into packets suitable for transfer across an ISDN network.

If the QoS threshold is not about to be exceeded, IWU 309 adapts the received data stream into the ATM fixed length cells. Switch unit 306 switches the ATM fixed length cells across to the ATM network interface 304, which provides the transport of the cell across the ATM network. If the ATM network comprises a SONET (synchronous optical) network, the ATM network interface adapts the ATM cells to the SONET framing protocol.

FIG. 3B—Block Diagram of ATM Node

Turning now to FIG. 3B, a more detailed block diagram illustrating ATM node 300a including an IWU 309 according to one embodiment of the present invention is shown. Node 300a includes IWU 309 having a user interface 308. User interface 308 includes a plurality of input/output ports 310. The user interface couples the ATM network to the user's premises devices, which include, for example telephony devices and local area networks (LANs). User interface 308 is thus coupled to receive data streams at input ports 310 via input lines 311. As noted above, the data streams comprise information in a variety of formats, including one or more of voice, video and data information. User interface 308 includes a format control unit 307 which is configured to adapt the data streams into the 48 byte ATM payload and add the 5 byte ATM header information.

User interface 308 is coupled to a switchunit 306, which switches the relevant packets to and from the ATM network interface 304. The ATM network interface 304 includes a plurality of input/output ports 312 which are coupled to receive data from the ATM network 305. The control CPU 302 is coupled to the ATM network interface 304, switch unit 306 and the user interface 308. In addition, control CPU 302 is coupled to receive control signals from the network management system 206. User interface 308 and ATM network interface 304 are additionally coupled to a plurality of input/output ports 314a–314c. Input/output ports 314a–314c are coupled to send and receive data via alternate networks.

User data streams are received at user interface 308 via the input/output ports 310. The data are identified according to data type. This information is likely to be provided, for example, when the input/output ports are configured. Before the data are processed, control CPU 302 receives a signal from the network management system 206 indicating a level of network usage and whether or not the bandwidth limit has been exceeded or approached. It is to be noted that the contract bandwidth limit will be known by the network management system 206, but the QoS threshold is preferably user defined. The QoS threshold is preferably less than or equal to the contract bandwidth limit. From this, the control CPU 302 determines whether or not the level of usage exceeds the pre-determined quality of service threshold. If the QoS threshold has been exceeded, the control CPU 302 determines which of the input streams are suitable for transmitting via an alternate network 212. Thus, for example, voice data may be transmitted via the public switched telephone network and data information may be switched via an ISDN connection. Information so designated is transferred to the appropriate input/output port 314a–314c, whereupon it is formatted to the alternate network protocol and transferred to the destination node (not shown). Thus, when the QoS threshold has been exceeded, at least a first portion of the data is sent via an alternate network 212. The remaining data are preferably sent through ATM network as is normally done.

If, however, the QoS threshold has not been exceeded, then all of the data are sent to the format control unit 307 for transmission over the ATM network. Format control unit 307 adapts the user information to the fixed cell ATM environment by formatting the incoming data into the 48 byte ATM payloads and applies the 5 byte ATM headers. Switch unit 306 then transfers the data to the ATM network interface unit 304. The ATM network interface unit may, for example, buffer the data in input/output ports 312 prior to transferring the data across the ATM network. Once the data are transferred, either by the ATM network or the alternate network to the destination node, the data are reincorporated into user data streams.

Reception of data from the ATM network, and alternate networks is handled similarly. The packetized ATM network data is received at one or more of input/output ports 312. It is then passed to ATM control 313 which provides the data to switch unit 306. Switch unit 306 transfers the information over to user interface 308, and format control unit 307 strips off the ATM header and provides it to the user via lines 311.

Similarly, secondary network data is received at one of the AAL ports 314a–314c. The data are then provided to the ATM network interface 304 where they are reintegrated with the ATM data streams. For example, the non-ATM information is adapted into the 48 byte packets or cells. The data streams are then transferred over to switch unit 306 which then provides them to the user interface 308. Format control unit 307 strips the newly added ATM information and provides the information to the user across lines 311. In an alternate embodiment, incoming data streams received across one of the alternate networks need not be adapted into the ATM cells prior to conversion into user-format. Thus, the data streams may be directly provided to the IWU 309 and then converted into the user-format.

In one embodiment, node 300 includes a memory unit 303 coupled to control CPU 302. Control CPU 302 receives usage information from the network management system and records times during which the QoS threshold is exceeded. In addition, the control CPU 302 monitors types and sources of data which cause the QoS threshold to be exceeded. This information is stored in a database in memory unit 303.

When incoming data streams are received, the control CPU 302 accesses the time, source, and other information stored in the database. If transfer of the data stream is expected to cause the QoS threshold to be exceeded, the data are transferred to the end node via an alternate network. Once the usage goes below, or is expected to go below, the QoS threshold, then all of the data is then transferred using the ATM network.

It is noted that this prediction method may be used either in conjunction with the actual threshold method described above, or in lieu of the actual threshold method described above.

Figure 4:
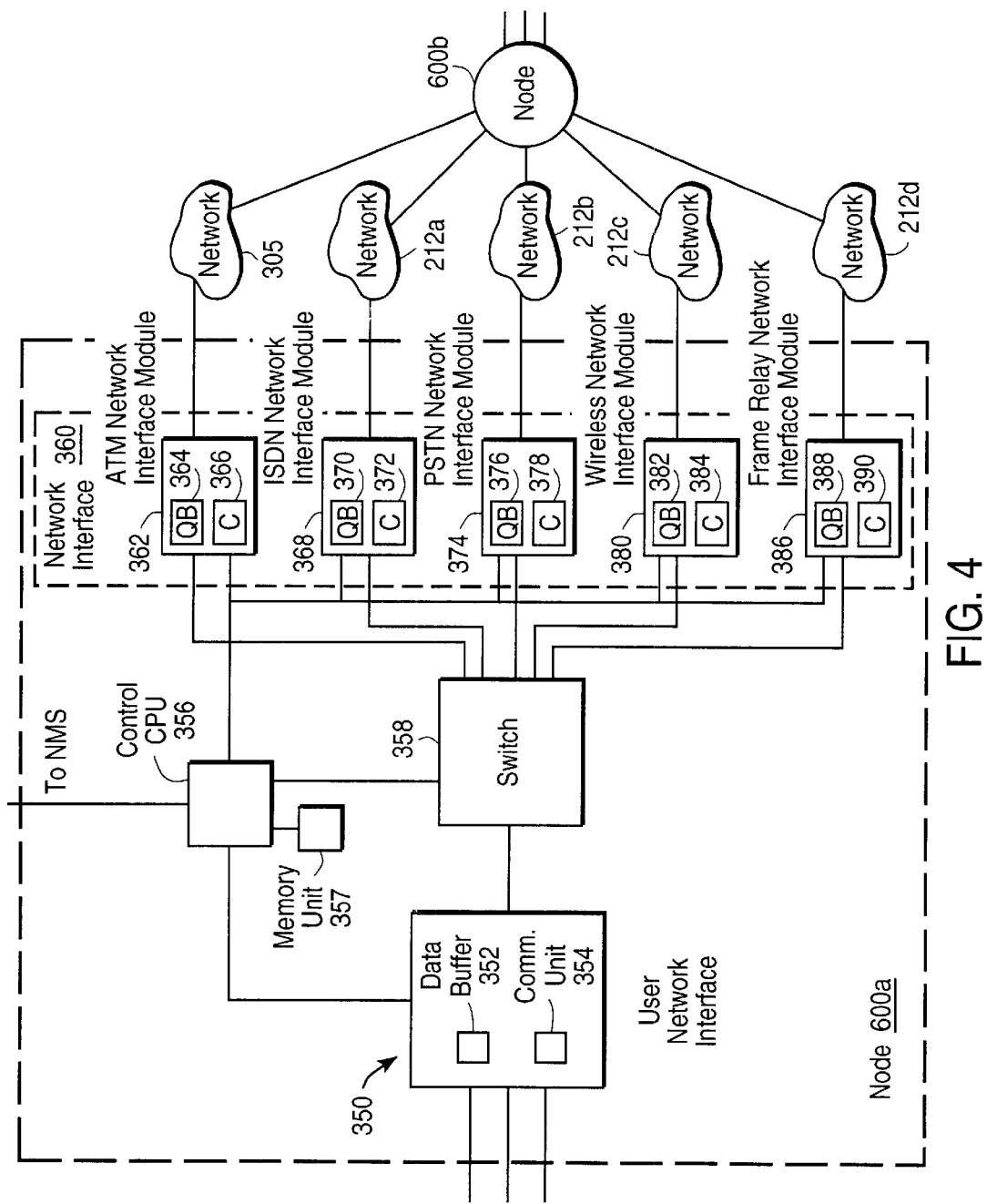
FIG. 4 is a block diagram of an ATM node according to another embodiment of the present invention.

FIG. 4—Alternate Embodiment of ATM Node

Turning now to FIG. 4, a block diagram showing another embodiment of an ATM user node 600a is illustrated. User node 600a includes a user network interface 350 coupled to a switching unit 358 and a control CPU 356. Control CPU 356 itself may be coupled to a memory unit 357, as will be discussed in greater detail below. The control CPU 356 is coupled to receive control signals from a network management system (not shown), preferably the ATM network manager. Control CPU 356 is further coupled to control switch unit 358, which is configured to switch incoming traffic from the user network interface 350 to a corresponding network interface module in the network interface 360. Switch unit 358 is coupled to network interface 360.

User network interface 350 includes one or more data buffers 352 configured to store incoming traffic, if necessary. A communications unit 354 is also provided, for communicating with control CPU 356 information such as the type of data. Switch unit 358 is coupled to switch the incoming traffic to the appropriate network interface. A default network is the ATM network. If, however, the control CPU 356 receives a signal from the network management system indicating that the QoS threshold is or is about to be exceeded, control CPU switches the traffic to an appropriate secondary network 212 according to data type.

Network interface 360 includes a plurality of network interfaces to telecommunications networks. More particularly, network interface 360 includes an ATM network interface module 362, an ISDN network interface module 368, a PSTN network interface module 374, a wireless network interface module 380, and a frame relay network interface module 386. It is noted that interfaces to other types of networks are contemplated; thus, FIG. 4 is exemplary only. Each network interface module 362, 368, 374, 380, 386, includes a queuing buffer (QB) 364, 370, 376, 382, 388, respectively, and a controller (C) 366, 372, 378, 384, 390, respectively. Each controller 366, 372, 378, 384, 390 serves to adapt the user traffic received from the switch 358 into a format compatible with the respective networks. Similarly, upon reception of traffic at the network interface modules from the corresponding alternate network, each controller 366, 372, 378, 384, 390 adapts the user traffic from the respective secondary network format into the user-compatible format prior to switching the data to the user network interface 350.

Operation of user node 600a is similar to that described above with respect to user node 300a in FIGS. 3a and 3b. User traffic in one or more formats is received at user network interface 350. It may temporarily be buffered in one or more buffers 352. Control CPU 356 receives one or more signals from the ATM network's network management system (not shown) indicative of usage levels. From this, the control CPU 356 determines whether traffic on the ATM network has exceeded the QoS threshold. If the network usage has not exceeded the bandwidth threshold, the traffic is switched by switch unit 358, under the control of control CPU 356, from the user network interface 350 to the ATM network interface module 362. The traffic is then routed to a destination node (not shown) via the ATM network (not shown), The control CPU 356 may determine, instead, that the QoS threshold is, or is about to be, exceeded. In this case, the control CPU 356 provides a corresponding signal to the user network interface advising of this condition. The user network interface's communications unit 354 then responds to the CPU 356 with a signal indicative of the type of data the user network interface is receiving. The control CPU 356 selects an appropriate secondary network based on the type of data, and causes switch unit 358 to switch the data to the appropriate secondary network interface. While the traffic is being transferred across the secondary network, the control CPU 356 continues to receive bandwidth usage information from the network management system. If the bandwidth usage drops below the QoS threshold, the traffic is routed via the ATM network.

Traffic is received at the ATM node 600a from end node 600b via the secondary networks in a similar fashion. For example, incoming traffic is received at the ISDN network interface module 368. It may be buffered in queuing buffer 370. The network interface module control unit 372 adapts the received ISDN format traffic into a format compatible with the end user. It is then switched to the user network interface 350 under the control of control CPU 356.

In one embodiment, ATM node 600*a* is provided with a memory unit 357. Memory unit 357 is used to store a database of past usage patterns, including time, traffic type, and bandwidth usage. The stored information is used by control CPU 356 to predict when the ATM network QoS threshold is likely to be exceeded. During those periods, the incoming traffic is switched to an appropriate secondary network. When the predicted period has elapsed, the traffic is switched back to the ATM network.

Figure 5:
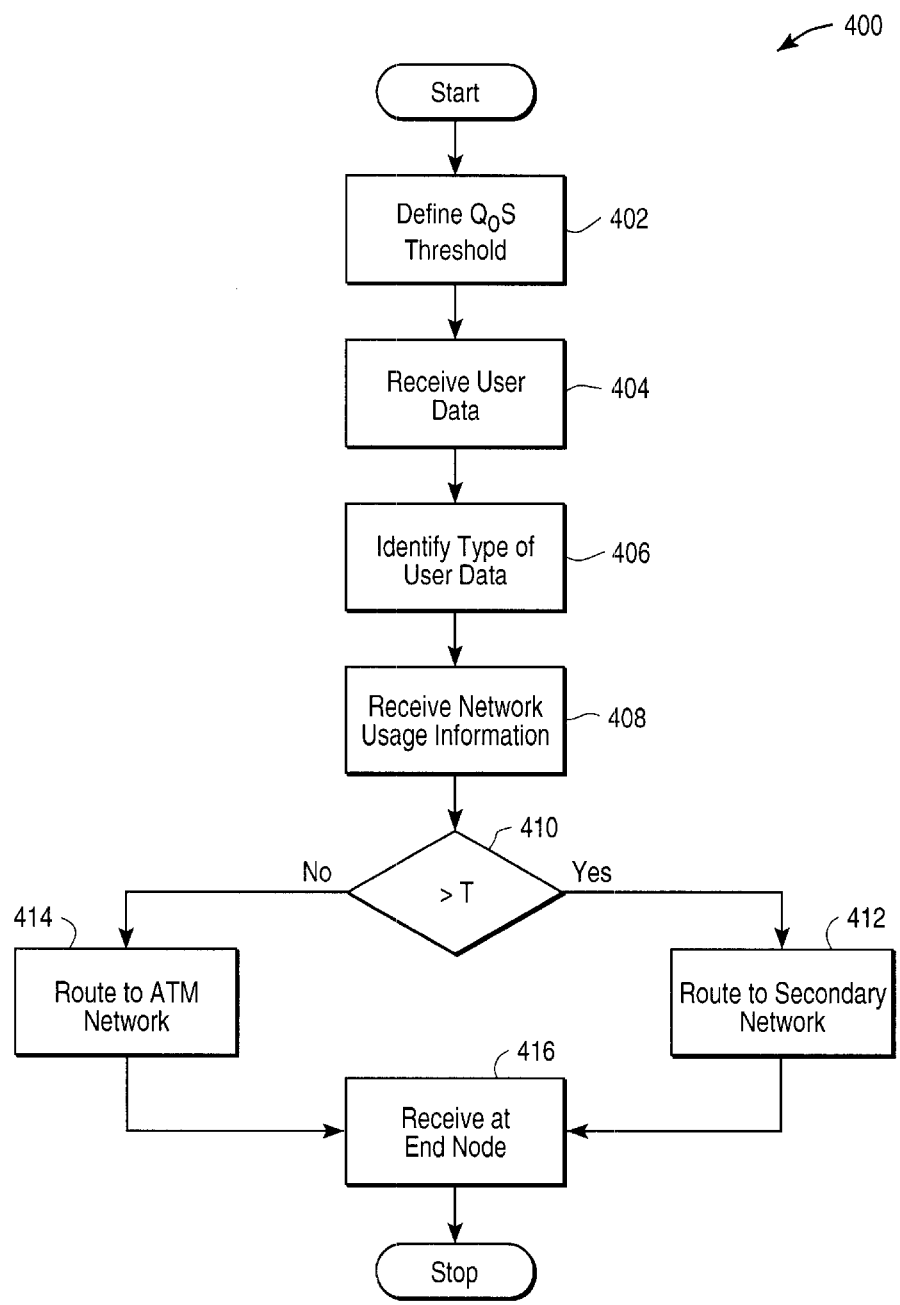
FIG. 5 is a flowchart illustrating operation of one aspect of the present invention.

FIG. 5—Flowchart of Cell Loss Prevention Method

Turning now to FIG. 5, a flowchart illustrating one method of preventing cell loss according to the present invention is illustrated. Initially, a QoS threshold is defined (Step 402). The QoS threshold is preferably defined relative to the QoS bandwidth limit provided for in the traffic contracts between the ATM user and the network provider. The QoS threshold is preferably less than or equal to the QoS bandwidth limit, which may be defined in terms of an absolute bandwidth or an average bandwidth. Typically, the QoS threshold is defined to be somewhat lower than the bandwidth limit defined in the traffic contract. In one embodiment, the traffic contract bandwidth is used as the QoS threshold, and there is no need to separately define the QoS threshold.

Once the QoS threshold has been defined, the ATM node commences receiving data (Step 404). The received data comprises one or more of voice, video or data information in at least a variety of synchronous, asynchronous, fixed or variable byte length formats. The types of data are then identified or classified (Step 406). This may be accomplished, for example, in FIGS. 3*a* and 3*b*, by the control CPU 302 identifying which input/output port 310 is receiving data (i.e., each input/output port receives only one type of data). A first input port may be configured to receive only voice data, a second input port may be configured to receive only video data, and so forth.

As the data are being received (or after they are buffered in the user interface 308), the control CPU 302 receives usage information from the network management system (Step 408). The control CPU 302 compares the usage levels with the QoS threshold. The usage levels are defined in terms of an absolute bandwidth requirement or an average bandwidth usage or any other predetermined method for determining usage. The control CPU 302 then determines whether or not the QoS threshold has been exceeded (Step 410).

If the threshold has not been exceeded, the data are routed via the ATM network (Step 414). Routing the data via the ATM network comprises, for example, adapting the data to the ATM fixed cell environment (i.e., applying the 5 byte header and configuring the information into the 48 byte payloads). The relevant virtual path and virtual channels are then established in order to accomplish the transfer to the end node (Step 416), as described above.

If, in Step 410, the QoS threshold is determined to be exceeded, control CPU 302 routes the data across the appropriate secondary network (Step 412). Routing the data comprises, for example, the control CPU 302 identifying which network is appropriate for the type of data.

For example, if the user data comprises voice and video information, the control CPU 302 may determine that the public switched telephone network (PSTN) is an appropriate secondary network for all or part of the voice portion of the received user information. Similarly, the control CPU 302 may determine that a cable television network is appropriate for all or part of the video portion of the user data.

The control CPU 302 may additionally establish a preference for which type of data are first routed to the secondary network or networks. For example, if an overflow condition occurs on the ATM network, the voice data will be re-routed first. If the overflow condition persists, or is sufficiently large, the control CPU 302 will re-route the video portion of the data.

Further, the control CPU 302 may establish a hierarchy of secondary networks, based on user preferences, including cost and error rates. The "overflow" user data are transferred via a secondary network according to those preferences. For example, a variety of secondary networks, such as the PSTN or an ISDN network may be appropriate for transmitting the voice portion of user data. The user may select a preference for the ISDN network. In that case, the user data which causes the ATM network threshold to be exceeded will be routed to the ISDN network rather than the PSTN.

Once the choice of the appropriate network has been made, the data are transferred and received at the end node (Step 416). Once at the end node, the data are provided to the end user and reintegrated with the remaining ATM transferred data, if necessary. For example, the data transferred via the secondary network does not necessarily arrive at the destination node at the same time as that sent via the ATM network. Whichever data arrives first may be buffered at the destination node until the rest "catches up." Thus, step 412 comprises adding control information related to this reintegration.

Figure 6:
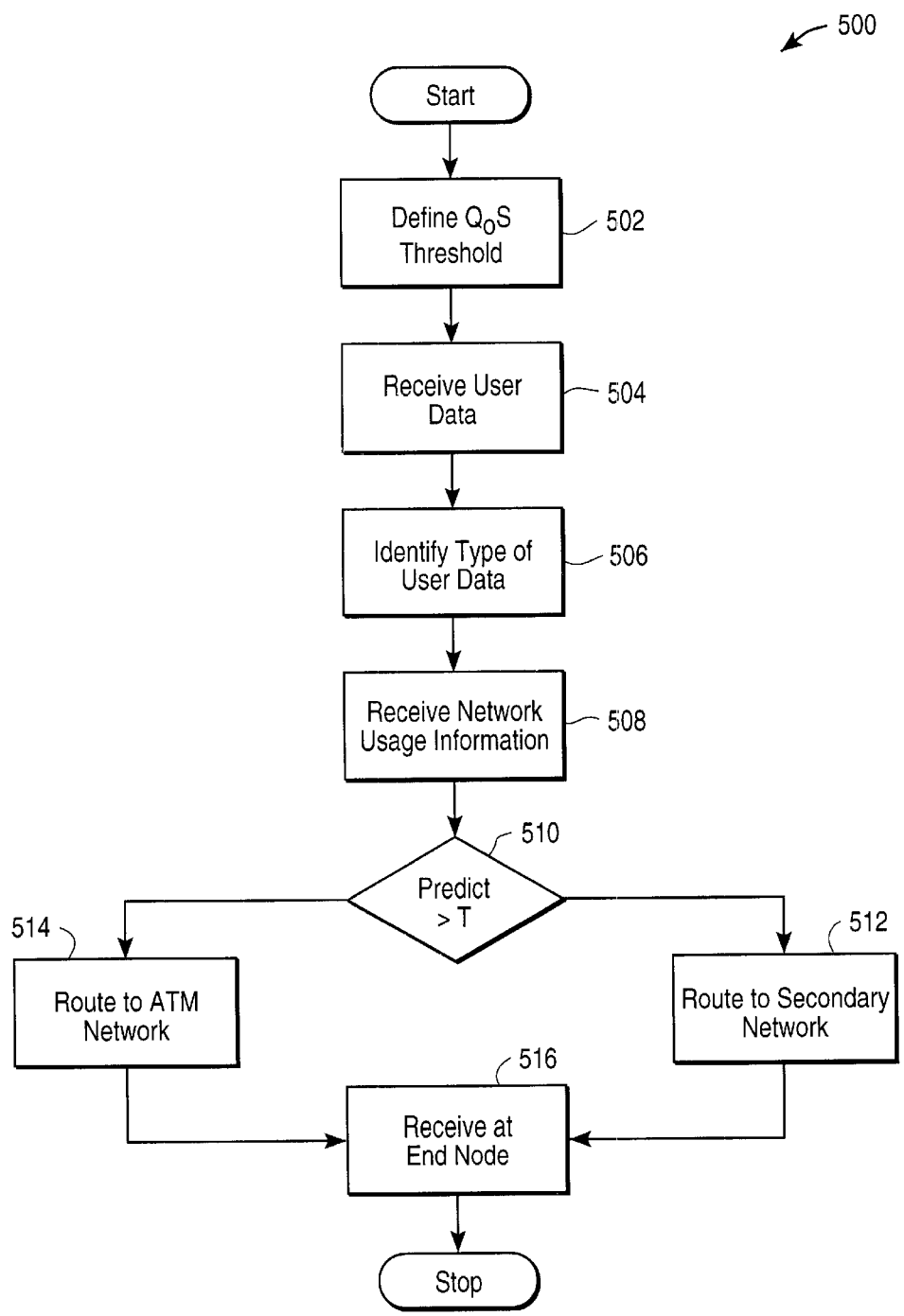
FIG. 6 is a flowchart illustrating operation of another embodiment of the present invention.

FIG. 6—Flowchart of Alternate Cell Loss Prevention Method

Turning now to FIG. 6, a flowchart illustrating an alternate method of preventing cell loss according to the present invention is illustrated. Initially, a QoS threshold is defined (Step 502). The QoS threshold is preferably defined relative to the QoS bandwidth limit provided for in the traffic contracts between the ATM user and die network provider. The QoS threshold is preferably less than or equal to the QoS bandwidth limit, which may be an average or absolute bandwidth limit. Typically, the QoS threshold is defined to be somewhat lower than the bandwidth limit defined in the traffic contract. In one embodiment, the traffic contract bandwidth is used as the QoS threshold, and there is no need to separately define the QoS threshold.

Once the QoS threshold has been defined, the ATM node commences receiving data (Step 504). The received data comprises one or more of voice, video or data information in at least one of a variety of synchronous, asynchronous, fixed or variable byte length formats. The types of data are then identified or classified (Step 506). This may be accomplished, for example, by the control CPU 302 identifying which input/output port 310 is receiving data (i.e., each input/output port receives only one type of data). A first input port may be configured to receive only voice data, a second input port may be configured to receive only video data, and so forth. As the data are being received (or after they are buffered in the user interface 308), the control CPU 302 receives usage information from the network management system (Step 508). The usage levels are defined in terms of an absolute bandwidth requirement or an average bandwidth usage or any other predetermined method for determining usage.

It is noted that the identification of the type of data and the reception of usage information is an on-going process, with time and type and usage associations preferably being stored by the control CPU 302 in a database in memory unit 303. The control CPU 302 then predicts, according to a statistical prediction algorithm, whether or not a current time and source association, for example, are likely to cause the user to exceed the QoS threshold (Step 510). If the prediction is negative, the data are routed by the ATM network. Routing the data via the ATM network comprises, for example, adapting the data to the ATM fixed cell environment (i.e., applying the 5 byte header and configuring the information into the 48 byte payloads). The relevant virtual path and virtual channels are then established in order to accomplish the transfer to the end node (Step 516).

If, however, the prediction is that the transmission of the particular data will cause the QoS threshold to be exceeded, the data are transferred via the secondary network (Step 512). This comprises, for example, the control CPU 302 identifying which network is appropriate for the type of data. For example, if the user data comprises voice and video information, the control CPU 302 may determine that the public switched telephone network (PSTN) is an appropriate secondary network for all or part of the voice portion of the received user information. Similarly, the control CPU 302 may determine that a cable television network is appropriate for all or part of the video portion of the user data.

The control CPU 302 may establish a preference for which type of data are first routed to the secondary network or networks. For example, if an overflow condition occurs on the ATM network, the voice data will be re-routed first. If the overflow condition persists, or is sufficiently large, the control CPU 302 will re-route the video portion of the data.

The control CPU 302 also may establish a hierarchy of secondary networks, independent of data type, based on user preferences, including cost and error rates. The "overflow" user data are transferred via a secondary network according to those preferences. For example, a variety of secondary networks, such as the PSTN or an ISDN network may be appropriate for transmitting the voice portion of user data. The user may select a preference for the ISDN network. In that case, the user data which causes the ATM network threshold to be exceeded will be routed to the ISDN network rather than the PSTN.

Once the choice of the appropriate network has been made, the data are transferred and received at the end node (Step 516). Once at the end node, the data are provided to the end user and reintegrated with the remaining ATM transferred data, if necessary. For example, the data transferred via the secondary network does not necessarily arrive at the destination node at the same time as that sent via the ATM network. Whichever data arrives first may be buffered at the destination node until the rest "catches up." Thus, step 512 comprises adding control information related to this reintegration.

The invention described in the above detailed description is not intended to be limited to the specific form set forth herein but, on the contrary, it is intended to cover such alternatives, modifications and equivalents as can reasonably be included within the spirit and scope of the appended claims.

We claim:

1. A network switching node, comprising:
   a control CPU;
   a user network interface coupled to said control CPU and coupled to receive user traffic;
   a first network interface configured to adapt at least a first portion of said user traffic into a first network format and transfer said at least first portion of said user traffic across a first network;
   at least one secondary network interface configured to adapt at least a second portion of said user traffic into a format compatible with at least one secondary network and transfer said at least a second portion of said user traffic across said at least one secondary network; and
   a switching unit intercoupling said user network interface, said control CPU said first network interface, and said at least one secondary network interface, wherein said switching unit is configured to switch said at least a second portion of said user traffic to said at least one secondary network interface responsive to said control CPU determining that a usage level of said first network exceeds a predetermined threshold;
   wherein said at least a second portion comprises a portion of said user traffic determined to exceed said predetermined threshold on said first network, wherein said second portion may comprise a portion of a same type of user traffic as the first portion; and
   wherein said first portion and said second portion are reintegrated at a destination.

2. The network switching node of claim 1, wherein said usage level is an actual usage level.

3. The network switching node of claim 1, wherein said usage level is a predicted usage level.

4. The network switching node of claim 1, wherein said usage level is a Quality of Service (QoS) threshold.

5. The network switching node of claim 1, wherein said at least one secondary network is an integrated services digital network (ISDN).

6. The network switching node of claim 1, wherein said at least one secondary network is a public switched telephone network (PSTN).

7. The network switching node of claim 1, wherein said at least one secondary network is a frame relay network.

8. The network switching node of claim 1, wherein said at least one secondary network is a cable broadcast television network.

9. The network switching node of claim 1, wherein said at least one secondary network is an X.25 network.

10. The network switching node of claim 1, wherein said first network is an ATM network.

11. The network switching node of claim 1, wherein said threshold is an absolute bandwidth threshold.

12. The network switching node of claim 1, wherein said threshold is an average bandwidth threshold.

13. A network switching node in accordance with claim 1, wherein said predicted usage level is determined using a predictive statistical analysis based on a type of traffic.

14. A network switching node in accordance with claim 13, wherein particular ones of said at least one secondary network interface are chosen based upon said type of traffic.

15. The network switching node of claim 1, wherein said determining is based on a predicted usage level and an actual usage level.

* * * * *